US010970702B2

(12) United States Patent
Sharma et al.

(10) Patent No.: US 10,970,702 B2
(45) Date of Patent: *Apr. 6, 2021

(54) SYSTEMS AND METHODS FOR FACILITATING MULTI-PARTY PAYMENT TRANSACTIONS

(71) Applicant: MASTERCARD INTERNATIONAL INCORPORATED, Purchase, NY (US)

(72) Inventors: Prashant Sharma, Ballwin, MO (US); Joshua Joseph Baron, Wildwood, MO (US); Deepankar Bhagat, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,173

(22) Filed: Feb. 4, 2019

(65) Prior Publication Data

US 2019/0172042 A1 Jun. 6, 2019

Related U.S. Application Data

(63) Continuation of application No. 13/941,954, filed on Jul. 15, 2013, now Pat. No. 10,198,723.

(51) Int. Cl.
*G06Q 30/00* (2012.01)
*G06Q 20/22* (2012.01)
(Continued)

(52) U.S. Cl.
CPC ............. *G06Q 20/22* (2013.01); *G06Q 20/12* (2013.01); *G06Q 20/28* (2013.01); *G06Q 30/06* (2013.01)

(58) Field of Classification Search
CPC ....................................................... G06Q 20/22
(Continued)

(56) References Cited

U.S. PATENT DOCUMENTS 7,104,443 B1 * 9/2006 Paul ..................... G06Q 20/105
235/375
8,275,704 B2 * 9/2012 Bishop .................. G06Q 20/40
705/39

(Continued)

FOREIGN PATENT DOCUMENTS

WO 0120523 A1 3/2001

OTHER PUBLICATIONS

NPL Search History.*

*Primary Examiner* — John H. Holly
(74) *Attorney, Agent, or Firm* — Armstrong Teasdale LLP

(57) ABSTRACT

A computer-implemented method for facilitating a payment transaction wherein a cardholder purchases an item from a merchant on behalf of a buyer is provided. The method includes receiving proposal data from a buyer computing device including at least one of an identification of an item proposed for purchase, a particular merchant, and a merchant purchase price. The method includes receiving a selection message from the buyer computing device indicating a selected cardholder chosen to purchase the item on behalf of a buyer using a merchant payment card associated with the particular merchant. The method includes reserving at least the merchant purchase price and a cardholder processing fee associated with the merchant payment card in a buyer account. The method includes transferring funds from the buyer account to a selected cardholder account, the funds determined at least in part by the merchant purchase price and the cardholder processing fee.

25 Claims, 8 Drawing Sheets

(51) Int. Cl.
    *G06Q 20/12*     (2012.01)
    *G06Q 20/28*     (2012.01)
    *G06Q 30/06*     (2012.01)
(58) Field of Classification Search
    USPC .... 705/39, 1.1, 26.1, 38, 35, 41, 53, 34, 14;
                                          235/380, 375, 379
    See application file for complete search history.

(56)              References Cited

U.S. PATENT DOCUMENTS

| | | |
|---|---|---|
| 8,639,587 B1 | 1/2014 | Whang |
| 2003/0110054 A1 | 6/2003 | Lindquist |
| 2006/0020783 A1 | 1/2006 | Fisher |
| 2009/0164320 A1 | 6/2009 | Galit |
| 2012/0066131 A1 | 3/2012 | Modi |

\* cited by examiner

SYSTEMS AND METHODS FOR FACILITATING MULTI-PARTY PAYMENT TRANSACTIONS

CROSS-REFERENCE TO RELATED APPLICATIONS

This application is a continuation application of U.S. patent application Ser. No. 13/941,954, filed Jul. 15, 2013, entitled "SYSTEMS AND METHODS FOR FACILITATING MULTI-PARTY PAYMENT TRANSACTIONS," the disclosure of which is hereby incorporated by reference in its entirety.

BACKGROUND

The field of the disclosure relates generally to payment transactions, and, more particularly, to facilitating a multi-party payment transaction that includes a cardholder purchasing a product from a merchant on behalf of a buyer wherein the cardholder makes the purchase using a payment card associated with the merchant.

Customer loyalty is one critical factor of the success of any business. To ensure that customers choose to return to a particular merchant, many merchants offer co-branded payment cards and/or private label payment cards. A merchant who offers one of these merchant payment cards may incentivize customers to utilize the merchant payment card at the merchant's business by offering discounts on merchandise, giving out rewards points redeemable for items of value, or any combination thereof. For example, a merchant specializing in the sale of electronics may provide a merchant payment card to customers and offer a 20% discount for purchases made with the payment card. Therefore, a customer associated with the particular merchant payment card of the merchant, hereinafter referred to as a "cardholder," may purchase a television that would generally cost $1,000 dollars for only $800 dollars.

However, not all customers may have the ability or desire to acquire a merchant payment card for the particular merchant from whom they wish to purchase an item. These customers, hereinafter referred to as "buyers," are not associated with the merchant payment card for the particular merchant, but may still wish to take advantage of the benefits offered by the merchant payment card. As merchant payment cards have become more popular, buyers may have multiple merchant payment cards available to them, but be unable to comfortably keep track of them. Buyers may additionally be unable to generate a credit history for multiple merchant payment cards. In other circumstances, a buyer may have sufficient funds to make a purchase, but not have acceptable credit to be approved for the merchant payment card.

In addition, cardholders may not be receiving any value from their merchant payment card. For example, a cardholder may have acquired a merchant payment card for a particular purchase, and utilized the card relatively infrequently since that time. Currently, cardholders may have significant credit available to purchase items from the merchant, but no need or desire to do so.

Therefore, there is a need in the art for systems and methods for facilitating a transaction wherein a cardholder purchases an item from a merchant on behalf of a buyer using a merchant payment card. In such systems and methods, the buyer receives some of the savings made available by the merchant payment card, without the need to acquire his or her own merchant payment card. In addition, the cardholder receives some value for purchasing an item on behalf of a buyer using the merchant payment card of the cardholder.

BRIEF DESCRIPTION OF THE DISCLOSURE

In an aspect, a computer-implemented method for facilitating a payment transaction wherein a cardholder purchases an item from a merchant on behalf of a buyer is provided. The method includes receiving proposal data from a buyer computing device, wherein the proposal data includes at least one of an identification of an item proposed for purchase, a particular merchant, and a merchant purchase price. The method also includes receiving a selection message from the buyer computing device, wherein the selection message indicates a selected cardholder chosen to purchase the item on behalf of a buyer using a merchant payment card associated with the particular merchant. The method also includes reserving, by the computing device, at least the merchant purchase price and a cardholder processing fee associated with the merchant payment card in a buyer account. The method also includes transferring funds from the buyer account to a selected cardholder account, the funds determined at least in part by the merchant purchase price and the cardholder processing fee.

In another aspect, a computer system for facilitating a payment transaction wherein a cardholder purchases an item from a merchant on behalf of a buyer is provided. The computer system includes a computing device coupled to a memory. The computing device configured to receive proposal data from a buyer computing device, wherein the proposal data includes at least one of an identification of an item proposed for purchase, a particular merchant, and a merchant purchase price. The computing device also configured to receive a selection message from the buyer computing device, wherein the selection message indicates a selected cardholder chosen to purchase the item on behalf of a buyer using a merchant payment card associated with the particular merchant. The computing device also configured to reserve at least the merchant purchase price and a cardholder processing fee associated with the merchant payment card in a buyer account. The computing device also configured to transfer funds from the buyer account to a selected cardholder account, the funds determined at least in part by the merchant purchase price and the cardholder processing fee.

In another aspect, a computer-readable storage medium having computer-executable instructions thereon for facilitating a payment transaction wherein a cardholder purchases an item from a merchant on behalf of a buyer is provided. When executed by at least one processor associated with a computing device and a memory, the computer-executable instructions cause the at least one processor to receive proposal data from a buyer computing device, wherein the proposal data includes at least one of an identification of an item proposed for purchase, a particular merchant, and a merchant purchase price. The computer-executable instructions also cause the processor to receive a selection message from the buyer computing device, wherein the selection message indicates a selected cardholder chosen to purchase the item on behalf of a buyer using a merchant payment card associated with the particular merchant. The computer-executable instructions also cause the processor to reserve at least the merchant purchase price and a cardholder processing fee associated with the merchant payment card in a buyer account. The computer-executable instructions also cause the processor to transfer funds from the buyer account to a selected cardholder account, the funds determined at least in part by the merchant purchase price and the cardholder processing fee.

DETAILED DESCRIPTION OF THE DISCLOSURE

Figure 1:
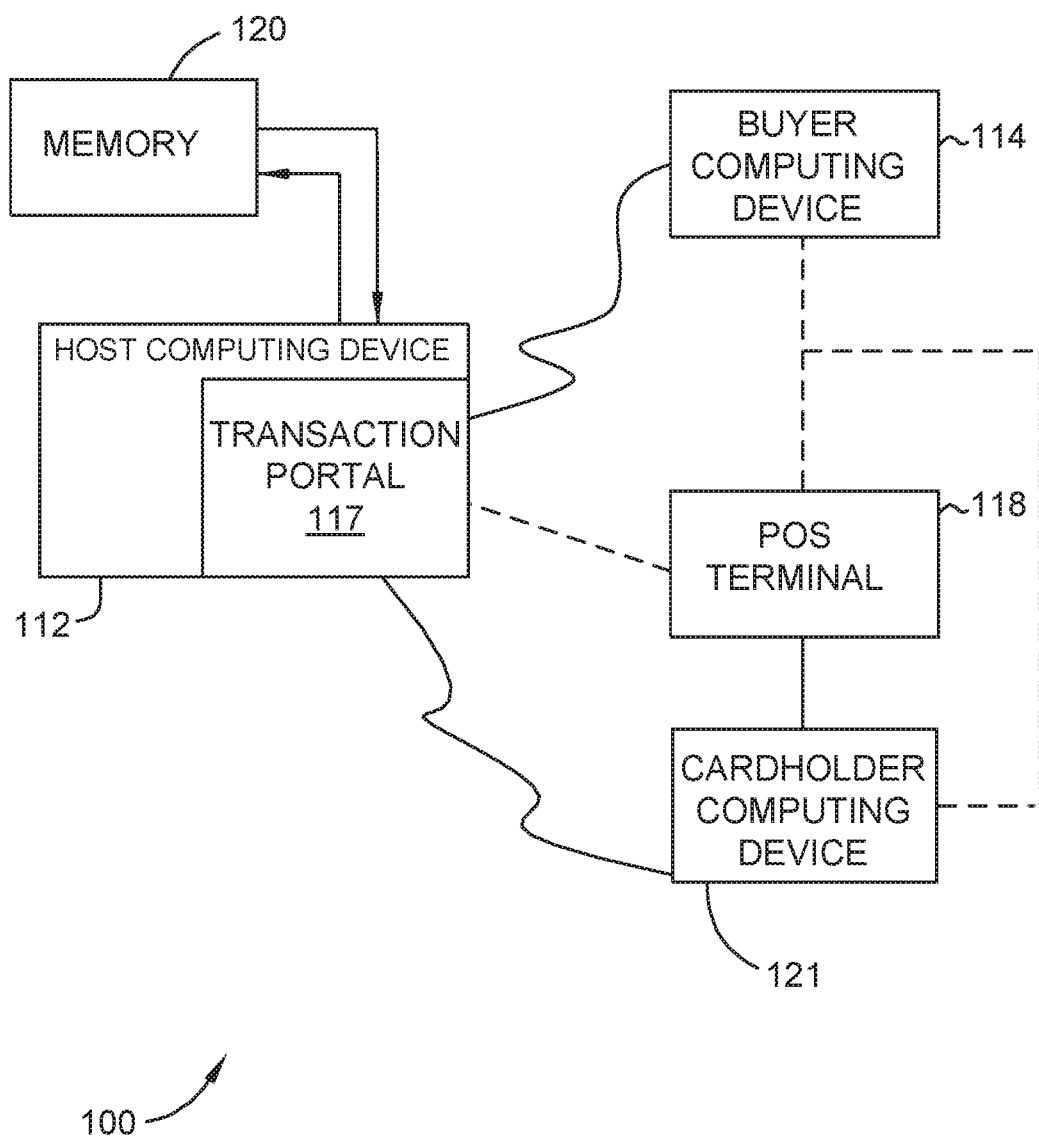
FIG. 1 is a block diagram of an example transaction computer system for processing multi-party payment transactions in accordance with the present disclosure.

Described in detail herein are example embodiments of systems and methods for facilitating a multi-party payment transaction that includes a cardholder purchasing an item from a merchant on behalf of a buyer wherein the cardholder uses a payment card associated with the merchant to make the purchase. The cardholder enters into an agreement with the buyer to make the purchase on behalf of the buyer in return for some fee charged to the buyer by the cardholder. More specifically, a transaction computer system including a host computing device, in communication with a memory and a user interface, is configured to implement a process that facilitates a cardholder's purchase of an item from a merchant on behalf of a buyer with a merchant payment card.

As described herein, the term "merchant payment card" refers to one of a co-brand payment card and a private label payment card. The co-brand payment card is a payment card issued by an issuer for a particular merchant to be used over a payment network, wherein the particular merchant, the issuer, and the payment network may have their brand represented on the payment card. For example, merchant A may associate with issuer Z and payment network X to generate a co-brand payment card in which at least two of merchant A's, issuer Z's and payment network X's brands are represented. The private-label payment card is a payment card issued by an issuer for a particular merchant to be used over a payment network, wherein the particular merchant's brand is solely represented on the payment card. Merchant payment cards are frequently associated with rewards, discounts or special offers provided by the merchant to the cardholder.

An example process implemented by the transaction computer system for facilitating a cardholder's purchase of an item from a merchant on behalf of a buyer with a merchant payment card is described below.

A plurality of cardholders 1-N, each having at least one merchant payment card, register with the host computing device through respective cardholder computing devices 1-N. Cardholders 1-N provide cardholder data to the host computing device, wherein the cardholder data includes at least data associated with each corresponding merchant payment card and a cardholder processing fee. The cardholder processing fee indicating a fee charged by the cardholder to a buyer in return for the cardholder purchasing an item on behalf of the buyer.

Buyer A of a plurality of buyers registers with the host computing device through a buyer computing device, and provides proposal data to the host computing device indicating at least one of an item desired for purchase, item I, a particular merchant, merchant Z, from which item I is to be purchased, and a merchant purchase price. The merchant purchase price indicates the cost charged by merchant Z to purchase item I using merchant Z's merchant payment card.

The host computing device provides relevant cardholder data including a list of relevant cardholders 1-N having a merchant payment card for merchant Z to buyer A. Host computing device also provides the cardholder processing fee for the relevant cardholders 1-N to buyer A.

Buyer A selects one of the relevant cardholders 1-N to purchase an item on behalf of the buyer based on the cardholder processing fee or other data, and transmits a selection message to the host computing device indicating the selected cardholder (e.g., selected cardholder 1).

The host computing device is configured to receive the selection message from the buyer computing device, and process the selection. The host computing device may be configured to determine if buyer A has sufficient funds available in an associated buyer account to cover the merchant purchase price and the cardholder processing fee. If insufficient funds are available, the host computing device may inform the buyer that insufficient funds are available and decline the purchase. If there are sufficient funds, host computing device is configured to transmit a transaction request message to selected cardholder 1. The transaction request message indicates at least item I, merchant Z, and the merchant purchase price.

Selected cardholder 1 may transmit a transaction confirmation message to the host computing device if selected cardholder 1 agrees to purchase the item on behalf of the buyer. Alternatively, selected cardholder 1 may transmit a transaction declination message to the host computing device if selected cardholder 1 does not agree to purchase the item on behalf of the buyer.

Once the host computing device receives a transaction confirmation message, the host computing device may be configured to again determine if buyer A has sufficient funds available in an associated buyer account to cover the merchant purchase price and the cardholder processing fee. If insufficient funds are available, the host computing device may inform the buyer that insufficient funds are available and decline the purchase. If there are sufficient funds, host computing device is configured to reserve the funds in buyer account.

The host computing device is configured to inform buyer A that selected cardholder 1 will perform the transaction, and to provide selected cardholder 1 with buyer data associated with buyer A (which facilitates identifying buyer A) for use with the purchase of item I. Buyer data includes at least a shipping address for buyer A. Host computing device may also be configured to generate a transaction e-mail address and provide the generated transaction e-mail address to the cardholder computing device. The generated transaction e-mail address is associated with the purchase of item 1 on behalf of Buyer A.

Selected Cardholder 1 then purchases item I from merchant Z, and enters buyer data and possibly transaction e-mail address into merchant Z's POS terminal.

The host computing device is configured to receive purchase data from at least one of selected cardholder 1 and merchant Z indicating that item I has been purchased on behalf of buyer A. Purchase data including at least one of a receipt, shipping confirmation, and other information indicating selected cardholder 1 purchased item I on behalf of buyer A.

The host computing device is further configured to transfer funds from the buyer account associated with buyer A to a selected cardholder account associated with selected Cardholder 1. The transferred funds include the merchant purchase price and the cardholder processing fee.

The host computing device may further be configured to receive a delivery confirmation message from buyer A indicating Item I has arrived. Host computing device may also be configured to receive a cardholder rating indicating buyer A's satisfaction with selected cardholder 1's performance. Host computing device may also be configured to receive a buyer rating indicating selected cardholder 1's satisfaction with buyer A's performance.

A technical effect of the systems and methods described herein include at least one of (a) receiving proposal data from a buyer computing device, wherein the proposal data includes at least one of an identification of an item proposed for purchase, a particular merchant, and a merchant purchase price; (b) receiving a selection message from the buyer computing device, wherein the selection message indicates a selected cardholder chosen to purchase the item on behalf of a buyer using a merchant payment card associated with the particular merchant; (c) reserving, by the computing device, at least the merchant purchase price and a cardholder processing fee associated with the merchant payment card in a buyer account; and (d) transferring funds from the buyer account to a selected cardholder account, the funds determined at least in part by the merchant purchase price and the cardholder processing fee.

As used herein, the term "payment card" refers to any suitable transaction card, such as a credit card, a debit card, a pre-paid card, a charge card, a membership card, a promotional card, a frequent flyer card, an identification card, a gift card, and/or any other device that may hold payment account information, such as mobile phones, Smartphones, personal digital assistants (PDAs), key fobs, tablets, and/or computers. Each type of transaction card can be used as a method of payment for performing a payment transaction.

As used herein, the term "payment transaction," "proposed transaction" or "transaction" refers to any suitable payment transaction in which a cardholder associated with a merchant payment card purchases an item on behalf of the buyer.

The detailed description illustrates embodiments of the invention by way of example and not by way of limitation. It is contemplated that the disclosure has general application to systems and methods that facilitate cardholders of merchant payment cards purchasing items on behalf of buyers. However, this disclosure is not intended to be limited to the embodiments described herein, but could be used in various other embodiments that are also covered by this disclosure.

FIG. 1 is a simplified block diagram of an example transaction system 100 comprising a plurality of computing devices. The plurality of computing devices includes host computing device 112, buyer computing device 114, point-of-Sale (POS) terminal 118, and cardholder computing device 121. In at least some embodiments, host computing device 112 may be a server or collection of servers configured to perform the functions described herein. In other embodiments, host computing device 112 may be communicatively coupled to a memory 120 and a user interface referred to herein as a transaction portal 117. Host computing device 112 is configured to generate the transaction portal 117, through which the buyer and a plurality of cardholders may interact with host computing device 112. In the example embodiment the transaction portal 117 may be a graphical user interface (GUI), although transaction portal may be any user interface capable of performing the functions described herein.

In the example embodiment, system 100 includes a host computing device 112, and a plurality of client sub-systems including a buyer computing device 114 and a cardholder computing device 121 connected to host computing device 112. In one embodiment, buyer computing device 114 and cardholder computing device 121 are any device capable of interconnecting to the internet, including a web-based phone, PDA, computer, laptop, or any other web-based connectable equipment. Also in the example embodiment, buyer computing device 114 and cardholder computing device 121 include a web browser, such that host computing device 112 is accessible using the Internet. More specifically, host computing device 112 may be accessible through transaction portal 117, transaction portal 117 being displayed in a web browser. Buyer computing device 114 and cardholder computing device 121 may be interconnected to the Internet through many interfaces including a network, such as a local area network (LAN) or a wide area network (WAN), dial-in-connections, cable modems, and special high-speed Integrated Services Digital Network (ISDN) lines.

System 100 also includes POS terminal 118, connecting a particular merchant with the transaction system. POS terminal 118 which may be connected to host computing device 112, may be connected to buyer computing device 114, and may be connected to cardholder computing device 121. POS terminal 118 are interconnected to the Internet through many interfaces including a network, such as a LAN, a WAN, dial-in-connections, cable modems, wireless modems, and special high-speed ISDN lines. POS terminal 118 could be any device capable of interconnecting to the Internet and including an input device capable of reading information associated with a payment card. In the example embodiment POS terminal 118 is a computer connected to the internet, and is configured to receive information associated with a payment card input through the merchant's website.

Memory 120 contains information on a variety of matters including buyer data and cardholder data as described below in greater detail. In one embodiment, memory 120 is stored on host computing device 112 and can be accessed by buyers and cardholders by logging onto host computing device 112 through transaction portal 117. In an alternative embodiment, memory 120 is stored remotely from host computing device 112 and may be non-centralized Memory 120 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program. Memory 120 may be configured to store cardholder data including at least one of a cardholder name, a cardholder address, cardholder account information, data relating to a merchant payment card associated with the cardholder, and a cardholder processing fee associated with the use of the merchant payment card. Cardholder account information includes information relating to at least one account in which funds may be deposited, including a savings account, checking account, or pre-paid card. Memory 120 may also store buyer data including a buyer name, buyer shipping address, buyer contact address, buyer account information, or any combination thereof. Buyer account information including information relating to at least one type of account from which funds may be transferred including a savings account, checking account, or pre-paid card. Memory 120 may also store data relating to purchased items including at least one of a gift receipt, shipping data, delivery confirmation messages, buyer ratings, cardholder ratings, or any combination thereof.

Transaction system 100 further includes a cardholder computing device 121. Cardholder computing device 121 may be a computer device and/or mobile device used by a cardholder for registering a merchant payment card with transaction portal 117 or making an on-line purchase. More specifically, cardholder computing device 121 may be a computer, smartphone, PDA, tablet, or any other device capable of performing the functions described herein. In the example embodiment, cardholder computing device 121 includes a memory device and a computing device in communication with the memory device and is communicatively coupled to host computing device 112 and POS terminal 118. Cardholder computing device 121 may optionally be communicatively coupled to buyer computing device 114. Cardholder computing device 121 may be in communication with host computing device 112, POS terminal 118, and buyer computing device 114 through any suitable network communication method including, but not limited to, WAN type communications, LAN type communications, 3G type communications, or WIMAX type communications.

Transaction system 100 includes a buyer computing device 114. Buyer computing device 121 may be a computing device and/or mobile device used by a buyer for registering with host computing device 112 through transaction portal 117. Buyer computing device 114 may also be used to transmit information to and receive information from host computing device 112. More specifically, buyer computing device 114 may be a computer, smartphone, PDA, tablet, or any other device capable of performing the functions described herein. In the example embodiment, buyer computing device 114 includes a memory device and a computing device in communication with the memory device and is communicatively coupled to host computing device 112. Buyer computing device 114 may optionally be communicatively coupled with POS terminal 118 to transmit and receive communications associated with the purchase of an item. Buyer computing device 114 may optionally be communicatively coupled to cardholder computing device 121. Buyer computing device 114 may be in communication with host computing device 112, POS terminal 118, and cardholder computing device 121 through any suitable network communication method including, but not limited to, WAN type communications, LAN type communications, 3G type communications, or WIMAX type communications.

Figure 2:
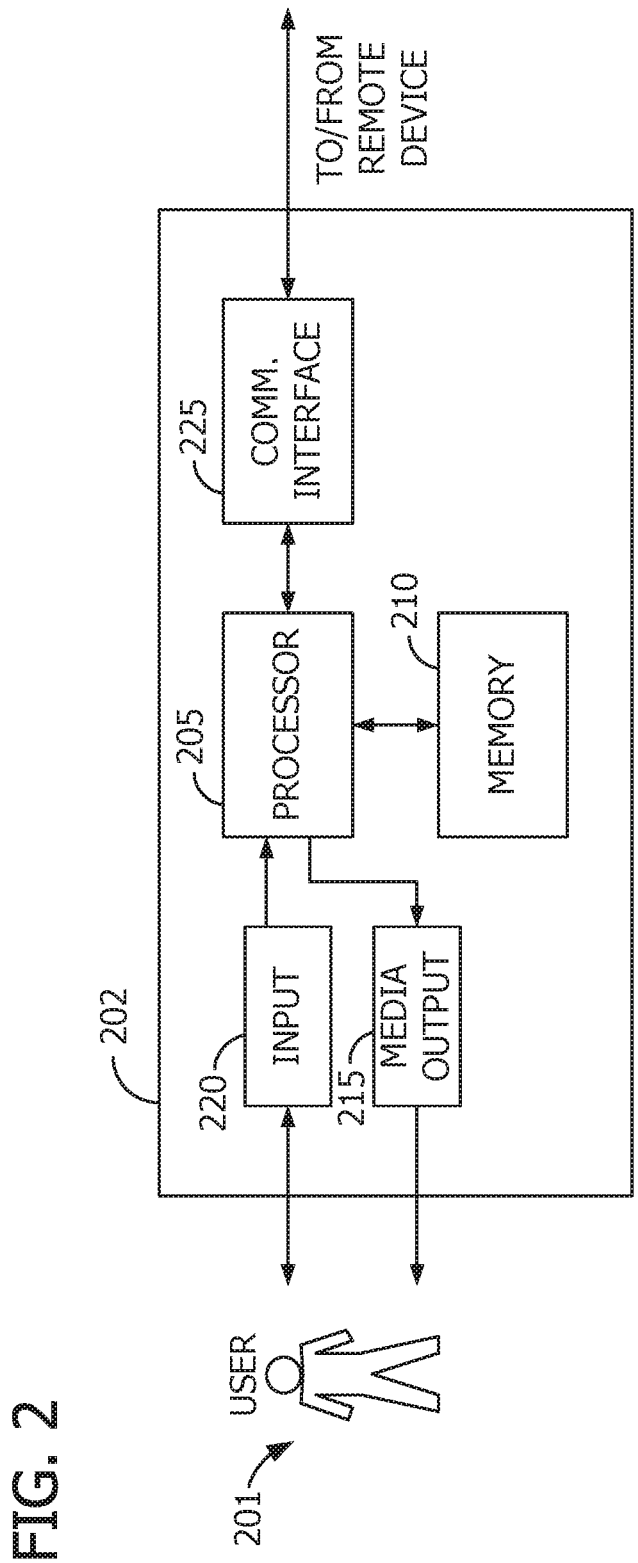
FIG. 2 illustrates an example configuration of a computing device in communication with a host computing device as illustrated in FIG. 1.

FIG. 2 illustrates an example configuration of a user computing system 202 operated by a user 201, such as a cardholder or a buyer. User computing system 202 may include buyer computing device 114, POS terminal 118, and cardholder computing device 121. In the example embodiment, user computing system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User computing system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user computing system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as host computing device 112. Communication interface 225 may include, for example, a wired or wireless network adapter or a wireless data transceiver for use with a mobile phone network, Global System for Mobile communications (GSM), 3G, or other mobile data network such as WIMAX.

Stored in memory area 210 are, for example, computer readable instructions for providing a user interface, such as transaction portal 117, to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website. In the example embodiment, a web browser may be used to interact with host computing device 112 through transaction portal 117.

Figure 3:
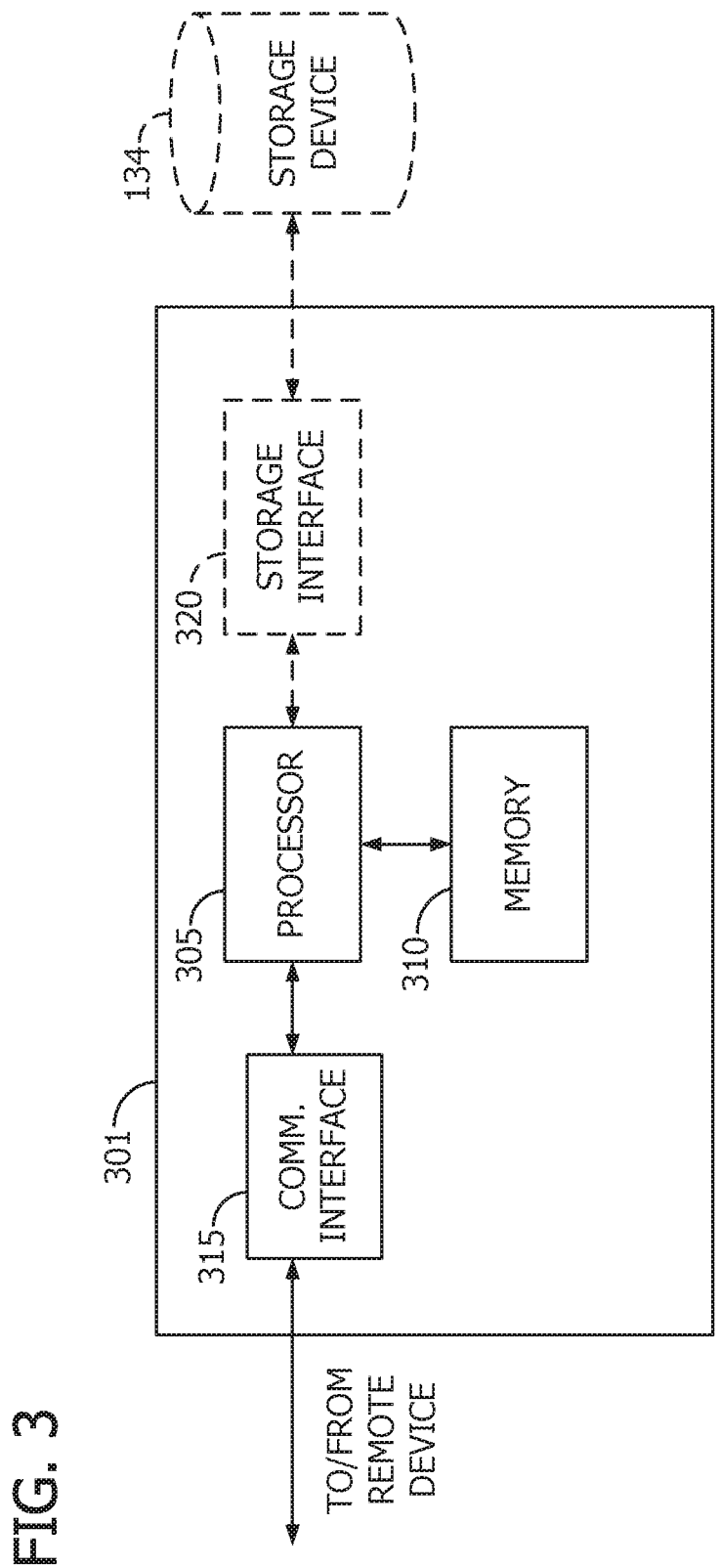
FIG. 3 illustrates an example configuration of a host computing device as shown in FIG. 1.

FIG. 3 illustrates an example configuration of a server system including a server such as host computing device 112 (shown in FIG. 1).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user computing system 201 or another server system 301. For example, communication interface 315 may receive requests from buyer computing device 114 and cardholder computing device 121 via the Internet, as illustrated in FIG. 1. More specifically, processor 305 may be programmed to provide the transaction portal 117 to buyer computing device 114 and cardholder computing device 121. The transaction portal may be configured to communicate cardholder and buyer data from the cardholder computing device 121 and buyer computing device 114 respectively to server system 301. Server system 301 may be configured to store the cardholder and buyer data in memory area 310. The transaction portal may also be configured to communicate transaction data from buyer computing device 114 to server system 301, the transaction data including at least a product identifier indicating an item to be purchased by a cardholder on behalf of the buyer, and a transaction amount. Server system 301 may be configured to receive a cardholder selection message including a selected cardholder chosen from the plurality of registered cardholders. The transaction portal may also be configured to transmit the transaction data to cardholder computing device 121 associated with the selected cardholder. Transaction portal 117 may also communicate purchase data, including confirmation that the item has been purchased by the selected cardholder, from cardholder computing device 121 to server system 301.

Processor 305 may be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 4:
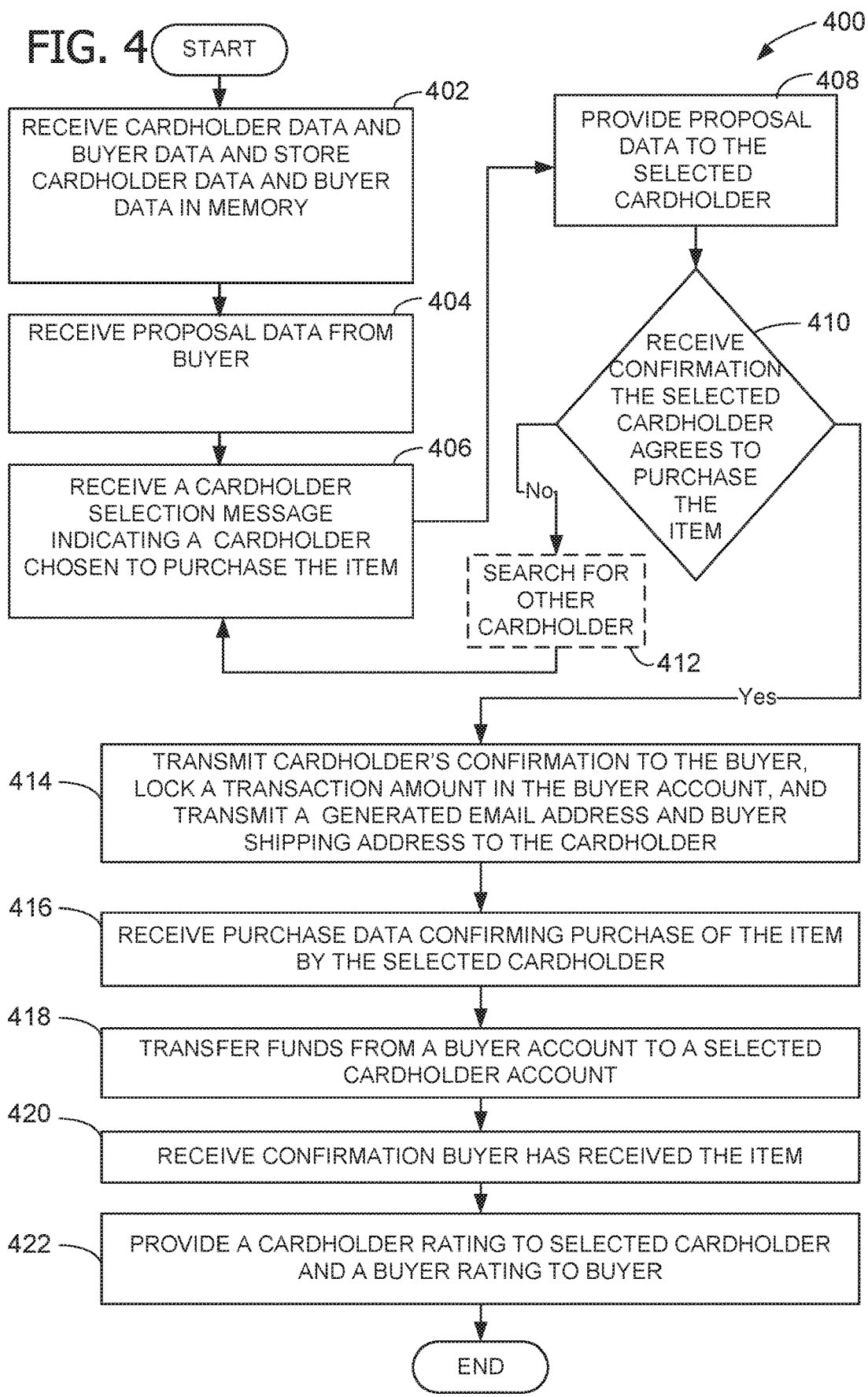
FIG. 4 is a simplified flowchart illustrating an example process implemented by the transaction computer system shown in FIG. 1 focusing on aspects associated with the host computing device.

FIG. 4 illustrates an example process implemented by transaction system 100 to facilitate a payment transaction wherein a cardholder purchases an item from a merchant on behalf of a buyer In the example embodiment, host computing device 112 is configured to receive cardholder data through transaction portal 117 and store, at Block 402, cardholder data in memory 120. Cardholder data is data associated with a plurality of cardholders and respective merchant payment cards. Cardholder data may include data relating to the merchant payment cards, cardholder processing fees associated with the merchant cards, and cardholder account information. Cardholder account information may be information relating to any type of account in which funds may be deposited, including, but not limited to, a saving account, checking account, or pre-paid card assigned to the cardholder. The cardholder processing fee is selected by the cardholder and indicates a fee charged to the buyer in return for cardholder purchasing an item on behalf of the buyer. Fee data may be one of a flat transaction amount (e.g., $5.00), a percentage of the purchase price (e.g., 5%), an amount of rewards points associated with the purchase of the item, or any combination thereof. In some embodiments, cardholder data may also include a cardholder name, cardholder address, a credit limit associated with merchant payment card, cardholder contact information, or any combination thereof.

Host computing device 112 is also configured to receive and store, at Block 402, buyer data in memory 120. The buyer data may include a buyer shipping address and buyer account information. The buyer data may also include a buyer name, buyer contact information, or any combination thereof. Buyer account information includes information relating to at least one type of account from which funds may be transferred including, but not limited to, a savings account, checking account, or pre-paid card assigned to the buyer.

Also in the example embodiment, host computing device 112 is configured to receive, at Block 404, proposal data from buyer computing device 114. The proposal data may include at least one of an identification of an item to be purchased, a particular merchant from whom the item is to be purchased, and a merchant purchase price.

Also in the example embodiment, host computing device 112 is configured to determine cardholders associated with merchant payment cards for the particular merchant indicated in the proposal data. Host computing device may be configured to provide a list these cardholders, referred to as relevant cardholders, to the buyer computing device 114 as relevant cardholder data. In at least some embodiments, relevant cardholder data may also include a cardholder rating and the cardholder credit limit associated with relevant cardholders.

In embodiments where the particular merchant is not provided in the proposal data, host computing device 112 may be configured to determine all merchants from whom the item may be purchased, and provide a list of cardholders associated with each of the merchants to the buyer computing device 114 as relevant cardholder data.

Also in the example embodiment, host computing device 112 is configured to receive, at Block 406, a selection message indicating a selected cardholder chosen to purchase the item on behalf of the buyer. In the example embodiment, the buyer may choose the selected cardholder based on at least one of the cardholder processing fee, cardholder rating, and cardholder credit limits associated with the each of the cardholders.

In the example embodiment, host computing device 112 is configured to determine if the buyer account has sufficient funds available to cover the merchant purchase price and the cardholder processing fee. If insufficient funds are available, the host computing device may inform the buyer that insufficient funds are available and decline the purchase. If there are sufficient funds, host computing device is configured to process the transaction.

In the example embodiment, host computing device 112 is configured to transmit, at Block 408, a transaction request message to cardholder computing device 121. The transaction request message may include the proposal data. The transaction request message may optionally include a buyer rating.

In response, host computing device 112 receives, at Block 410, a cardholder confirmation message indicating the selected cardholder agrees to purchase the item on behalf of the buyer.

Alternatively, host computing device 112 may receive, at Block 410, a transaction declination message indicating that the selected cardholder does not agree to purchase the item on behalf of the cardholder. In such an event, host computing device 112 may inform buyer of the declination, and search, at Block 412, for a new cardholder to purchase the item on behalf of the buyer. In the example embodiment, host computing device is configured to again provide the relevant cardholder data to buyer computing device 112 and receive a new selection message.

In some instances, host computing device 112 may not receive any indication from cardholder computing device 121 within a predetermined time. In such an event, host computing device 112 may inform buyer of the timeout, and search, at Block 412, for a new cardholder to purchase the item on behalf of the buyer. In the example embodiment, host computing device is configured to again provide the relevant cardholder data to buyer computing device 112 and receive a new selection message.

In the example embodiment, once the host computing device receives a transaction confirmation message, the host computing device may be configured to determine if the buyer has sufficient funds available in buyer account to cover the merchant purchase price and the cardholder processing fee. If insufficient funds are available, the host computing device may inform the buyer that insufficient funds are available and decline the purchase. If there are sufficient funds, host computing device is configured to reserve the funds in buyer account, and transmit the confirmation to buyer computing device 114. In the example embodiment, buyer account is a pre-paid card assigned to the buyer by host computing device 112. In other embodiments buyer account may be any account from which funds may be transferred, such as a checking account or savings account.

In the example embodiment, host computing device 112 may further be configured to provide, at Block 414, at least a buyer shipping address to cardholder computing device 114. Host computing device 112 may further be configured to generate a transaction email address associated with the payment transaction, and provide the transaction email address to cardholder computing device 121. In the example embodiment, the transaction email address is generated by host computing device 112 for each particular payment transaction.

In the example embodiment, host computing device 112 is configured to receive, at Block 416, purchase data confirming purchase of the item by the selected cardholder. In the example embodiment, purchase data may include at least one of a shipping confirmation message, and a gift receipt associated with the payment transaction. In at least some embodiments, the purchase data further includes a purchase amount, a time of purchase, an expected arrival data, and other details related to the transaction. In the example embodiment, purchase data may be received through the transaction email address associated with the transaction from at least one of POS terminal 118 and cardholder computing device 121.

In the example embodiment, host computing device 112 is further configured to transfer, Block 418, funds from a buyer account to a selected cardholder account. In the example embodiment, the transferred funds are equal to the sum of the merchant purchase price and cardholder processing fee. Also, in the example embodiment, the buyer account and the selected cardholder account are pre-paid cards associated with the buyer and selected cardholder respectively. In other embodiments, buyer account and selected cardholder account may be any other type of account which may be used to send and receive funds, such as a checking account or a savings account.

In the example embodiment, host computing device 112 is configured to receive, at Block 420, a delivery confirmation message. The delivery confirmation message may be sent from buyer computing device 114, and indicates that the item has been delivered to buyer at buyer shipping address. In the example embodiment, the delivery confirmation message may also include a date and time of delivery, a condition of the product when delivered, or any combination thereof.

Also in the example embodiment, host computing device 112 is configured to receive, at Block 422, a cardholder rating from buyer computing device 114, and a buyer rating from cardholder computing device 121. The buyer and cardholder ratings may reflect overall satisfaction with the transaction from the buyer and the cardholder, as well as satisfaction with specific categories of performance. For example, a specific category of performance for the cardholder may include promptness in purchasing the item. The host computing device 112 is configured to store the cardholder rating and buyer rating in memory 120 as part of the cardholder data and the buyer data respectively.

Figure 5:
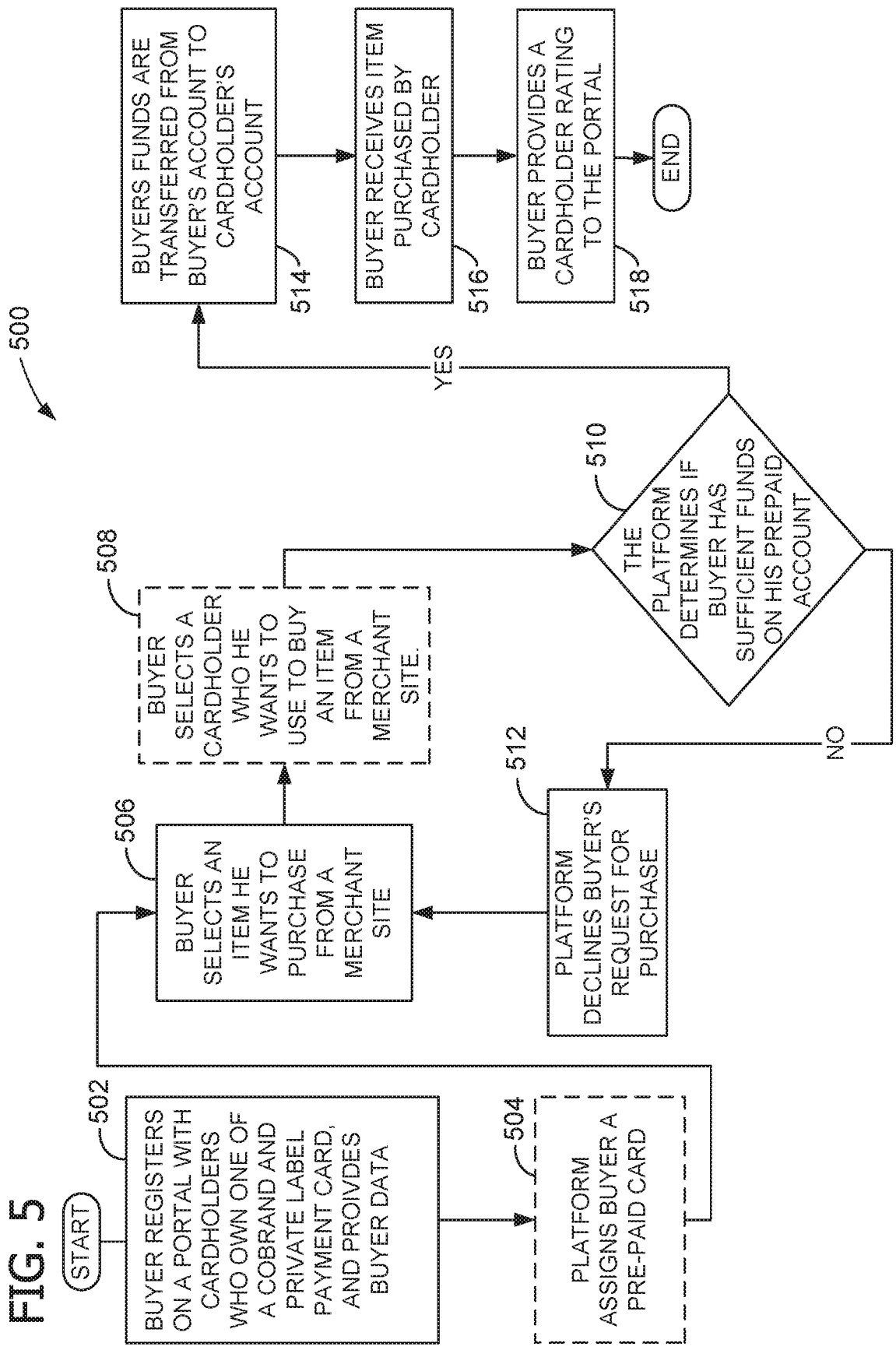
FIG. 5 is a simplified flowchart illustrating an example process implemented by the transaction computer system shown in FIG. 1 focusing on aspects associated with the buyer.

FIG. 5 illustrates the example process shown in FIG. 4 from the perspective of the buyer. The process of FIG. 5 is implemented by transaction system 100. System 100 includes computing device 114 in communication with transaction portal 117 and host computing device 112 to facilitate the payment transaction.

In the example embodiment, at Block 502, buyer registers with host computing device 112 through transaction portal 117 using buyer computing device 114. Buyer computing device 114 is configured to transmit buyer data to host computing device 112.

The buyer may optionally be assigned, at Block 504, a pre-paid card by host computing device 112 for use with transaction system 100. In such an embodiment, buyer would load funds on the pre-paid card for use in purchasing an item through transaction portal 117.

In the example embodiment, at Block 506, buyer determines an item he would like to have purchased on his behalf from a particular merchant, and uses buyer computing device 114 to transmit proposal data to host computing device 112. In response, buyer may receive relevant cardholder data from host computing device 112.

In the example embodiment, the buyer may select, at Block 508, a selected cardholder to purchase the item on his behalf and transmit a selection message to host computing device 112. In the example embodiment, the buyer may select a cardholder from among the plurality of relevant cardholders indicated by the relevant cardholder data. Further in the example embodiment, buyer may sort the relevant cardholders on buyer computing device 114 based on at least one of the cardholder processing fee to use the merchant payment card, the credit limit of the respective merchant payment card, and the cardholder rating.

Also in the example embodiment, host computing device 112 is configured to determine, at Block 510, the funds available in a buyer account. If the buyer account has funds equal to or in excess of the sum of the merchant purchase price the cardholder processing fee then host computing device 112 is configured to transmit a transaction request message to cardholder computing device 121 associated with the selected cardholder. If the buyer account has insufficient funds, host computing device 112 declines, at Block 512, buyer's request to purchase the item.

Further in the example embodiment, buyer computing device 114 is configured to receive, at Block 514, an indication that funds have been transferred from buyer account to a selected cardholder account.

Further in the example embodiment, buyer receives, at Block 516, the item purchased by the selected cardholder, and uses buyer computing device 114 to transmit a delivery confirmation message to host computing device 112.

Also in the example embodiment, buyer computing device 114 is configured to transmit, at Block 518, a cardholder rating to host computing device 112.

Figure 6:
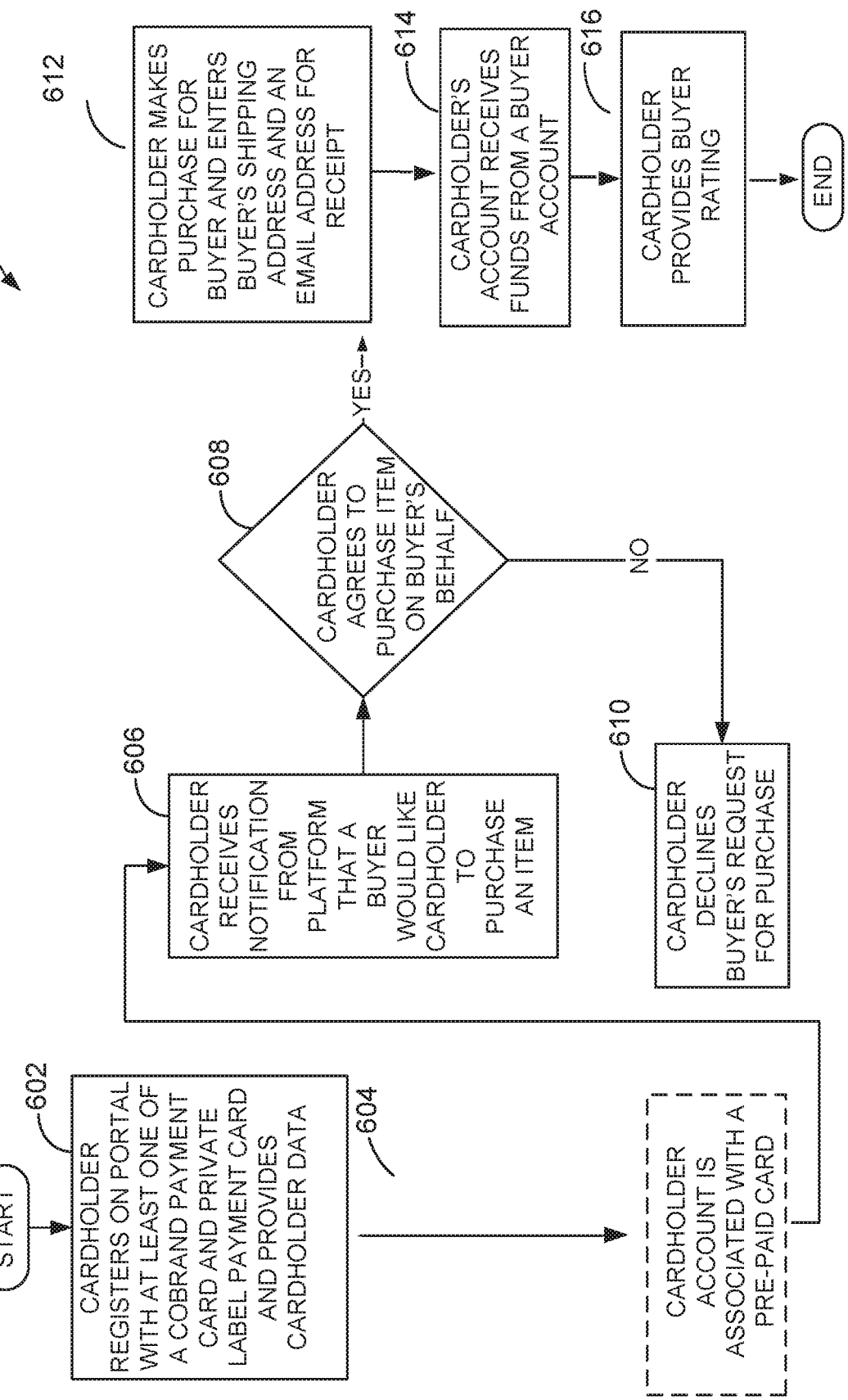
FIG. 6 is a simplified flowchart illustrating an example process implemented by the transaction computer system shown in FIG. 1 focusing on aspects associated with the cardholder.

FIG. 6 illustrates the same example process shown in FIG. 4 but from the perspective of the cardholder. The process of FIG. 6 is implemented by transaction system 100. System 100 includes computing device 114 in communication with transaction portal 117 and host computing device 112 to facilitate the payment transaction.

In the example embodiment, at Block 602, a cardholder registers with host computing device 112 by transmitting cardholder data through transaction portal 117 using cardholder computing device 121.

The cardholder may optionally be assigned, at Block 604, a pre-paid card by host computing device 112 for use with transaction portal 117. In such an embodiment, cardholder would receive funds on the pre-paid card in return for making purchases on behalf of buyers.

In the example embodiment, cardholder computing device 121 is configured to receive, at Block 606, a transaction request message from host computing device 112 that a buyer would like cardholder to purchase an item on buyer's behalf.

In the example embodiment, cardholder computing device 121 is configured to transmit, at Block 608, a transaction confirmation message to host computing device 112 indicating the cardholder's agreement to purchase the item. In response, cardholder computing device 121 may receive proposal data, buyer data, and a transaction e-mail address for use in purchasing the item. Alternatively, the cardholder computing device 121 may be configured to transmit, at Block 610, a transaction declination message to host computing device 112 indicating the cardholder does not agree to purchase the item.

In the example embodiment, cardholder computing device 121 may be configured to purchase, at Block 612, the item from the particular merchant using the merchant payment card associated with the particular merchant. In the example embodiment, cardholder purchases the item through POS terminal 118 associated with the particular merchant. Also in the example embodiment, cardholder enters the buyer shipping address and a transaction e-mail address into POS terminal 118. The cardholder computing device 121 is further configured to transmit purchase data to host computing device 112.

In the example embodiment, cardholder computing device 121 is configured to receive, at Block 614, notification that the cardholder account has received funds from the buyer account.

Also in the example embodiment, cardholder computing device 121 is configured to transmit, at Block 616, a buyer rating through transaction portal 117 to host computing device 112. The buyer rating may reflect the cardholder's overall satisfaction with the transaction, as well as satisfaction with specific categories of performance, such as buyer trustworthiness.

Figure 7:
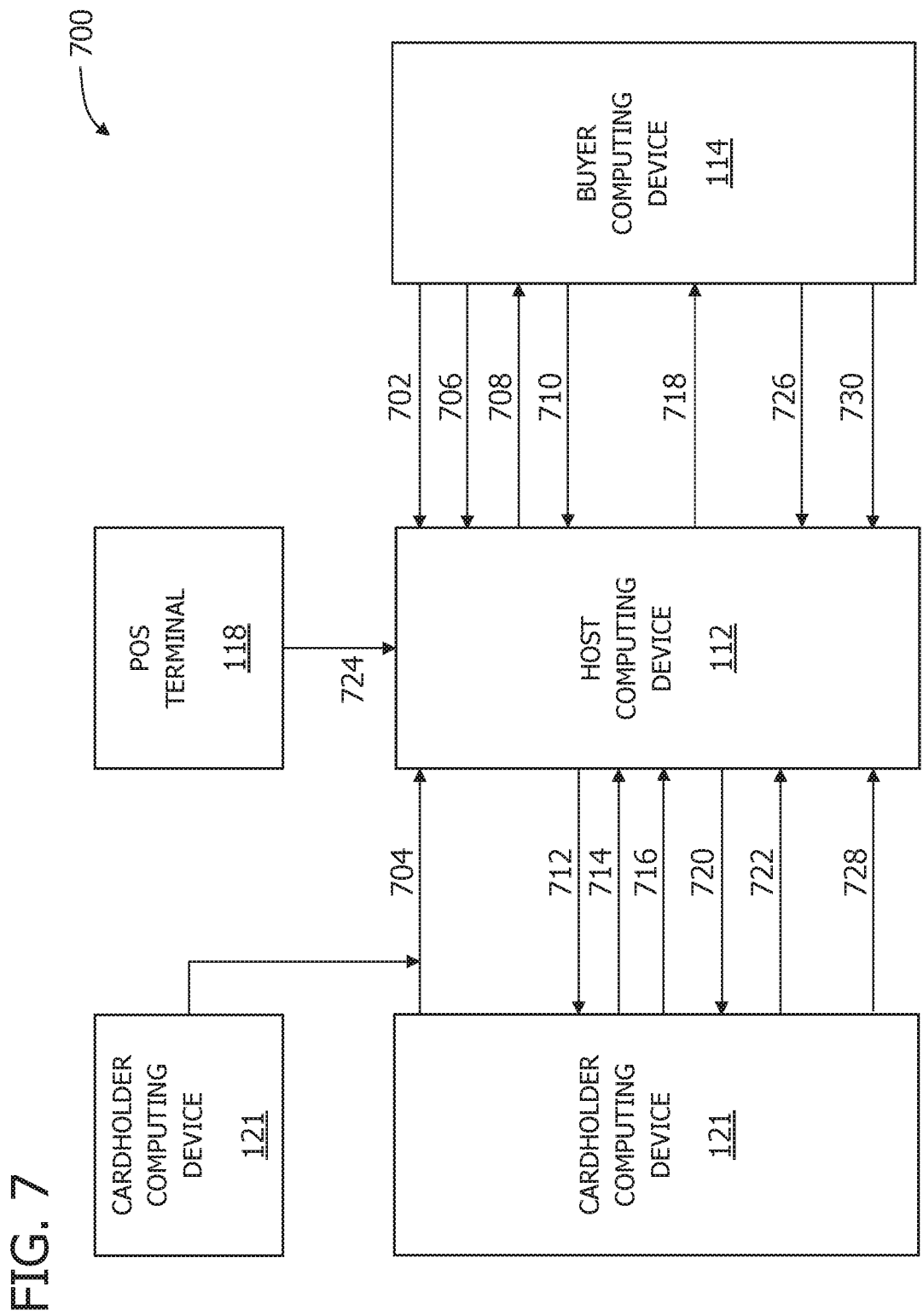
FIG. 7 illustrates the flow of messages between the computing devices of the transaction computer system shown in FIG. 1.

FIG. 7 illustrates a flow 700 of messages between host computing device 112, buyer computing device 114, cardholder computing device 121, and POS terminal 118.

At Block 702, buyer uses buyer computing device 114 to transmit buyer data to host computing device 112.

At Block 704, a plurality of cardholder computing devices 121 provide cardholder data to the host computing device.

At Block 706, buyer computing device 114 provides proposal data to host computing device 112.

At Block 708, host computing device 112 is configured to provide relevant cardholder data to buyer computing device 114 based on the proposal data.

At Block 710, buyer computing device 114 is configured to transmit a selection message indicating a selected cardholder, chosen from among the relevant cardholders, to purchase the item on behalf of buyer.

At Block 712, host computing device 112 processes the selection message, determines whether a buyer account has sufficient funds, and transmits a transaction request message to the selected cardholder computing device 121.

At Block 714, cardholder computing device 121 provides a transaction confirmation message indicating the cardholder agrees to purchase the item on behalf of the buyer to the host computing device 112.

Alternatively, at Block 716, cardholder computing device 121 associated with the selected cardholder provides a transaction declination message to the host computing device 112 indicating the selected cardholder does not agree to purchase the item on behalf of the buyer.

At Block 718, host computing device 112 is configured to transmit the determination of the selected cardholder to buyer computing device 114.

At Block 720, host computing device 112 is configured to provide at least the buyer shipping address to cardholder computing device 121. In some embodiments host computing device 112 is further configured to generate a transaction e-mail address and provide the generated transaction e-mail address to the cardholder computing device 121.

At Block 722, host computing device 112 is configured to receive purchase data from cardholder computing device 121.

At Block 724, host computing device 112 may also be configured to receive purchase data indicating that the item has been purchased on behalf of the buyer from POS terminal 118. In at least one embodiment, POS terminal 118 may use the generated transaction email address to transmit purchase data from POS terminal 118 to host computing device 112.

At Block 726, buyer computing device is configured to provide a delivery confirmation message to the host computing device 112.

At Block 728, host computing device 112 is configured to receive a cardholder rating from buyer computing device 114.

At Block 730, host computing device 112 is configured to receive a buyer rating from selected cardholder computing device 121.

Figure 8:
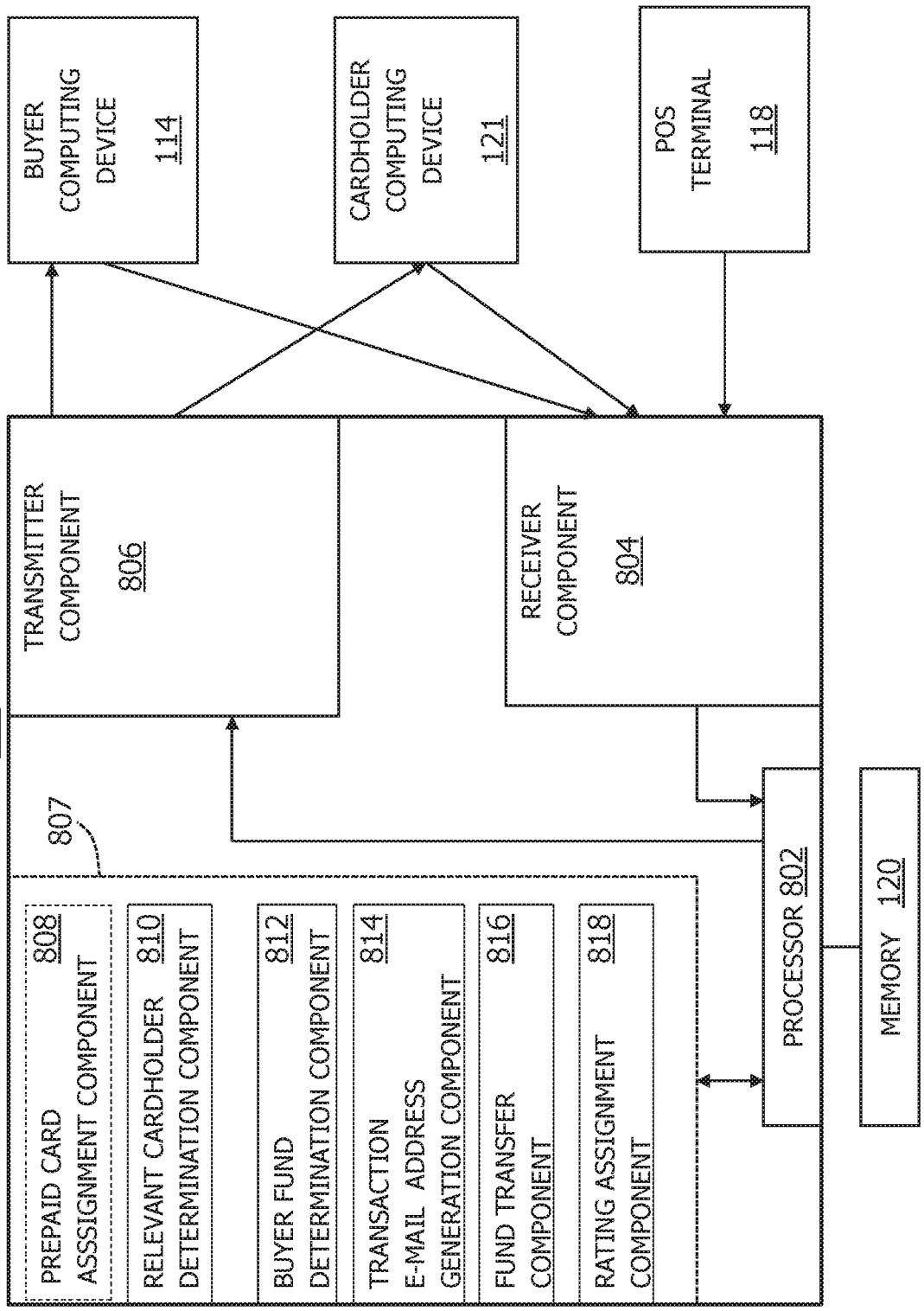
FIG. 8 illustrates the components involved in performing the functions of the transaction computer system shown in FIG. 1.

FIG. 8 illustrates a component view 800 of transaction system 100 comprising a host computing device 112, a processor 802, a receiver component 804, a transmitter component 806, and multiparty transaction components 807.

Processor 802 is communicatively coupled to memory 120, receiver component 804, transmitter component 806, and multi-party transaction components 807. The processor 204 can execute instructions within the host computing device 112, including instructions stored in the memory 120 or in internal memory. The processor may be implemented as chips that include separate and multiple analog and digital processors. The processor may provide, for coordination of the other components of the host computing device 112. For example processor 802 is configured to receive buyer data and cardholder data through receiver component 804, processes the data, and store the data in memory 120.

Receiver component 804 is communicatively coupled to buyer computing device 114, POS terminal 118, cardholder computing device 121 and processor 802. Receiver component 804 is configured to receive data from at least one of the buyer computing device 114, POS terminal 118, and cardholder computing device 121, and to provide the data to processor 802.

Transmitter component 806 is communicatively coupled to buyer computing device 114, cardholder computing device 121 and processor 802. Transmitter component is configured to receive information from processor 802 and transmit that information to at least one of buyer computing device 114 and cardholder computing device 121.

Multi-party transaction components 807 are configured to perform multiple functions associated with host computing device 112 for facilitating a multi-party transaction. More specifically, multi-party transaction components 807 comprise an optional pre-paid card assignment component 808, a relevant cardholder determination component 810, a buyer fund determination component 812, a transaction e-mail address generation component 814, a fund transfer component 816, and a rating assignment component 818.

Pre-paid card assignment component 808 is configured to receive at least one of buyer data and cardholder data and assign the respective at least one buyer and cardholder a pre-paid card. The assigned pre-paid card is utilized in performing transactions with the transaction system 100.

Relevant cardholder determination component 810 is configured to receive proposal data and cardholder data, and determine cardholders associated with a merchant payment card for the particular merchant.

Buyer fund determination component 812 is configured to determine the level of funds available in a buyer account and determine whether buyer account has funds equal to or greater than the sum of the merchant purchase price and cardholder processing fee. Buyer fund determination component 812 may also be configured to reserve the funds in the buyer account if sufficient funds are found in response to the transaction confirmation message.

Transaction e-mail address generation component 814 is configured to generate a transaction e-mail address in response to receiver component 804 receiving a transaction confirmation message from cardholder computing device 121.

Fund transfer component 816 is configured to transfer funds from a buyer account associated with the buyer to a selected cardholder account associated with the selected cardholder.

Rating assignment component 818 is configured to assign a received buyer rating to the buyer and a received cardholder rating to the cardholder.

Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

While the embodiments have been described in terms of various specific embodiments, those skilled in the art will recognize that the embodiments can be practiced with modification within the spirit and scope of the claims. Specifically, though the embodiments described herein make reference to a host computing device 112 in communication with transaction portal 117 and configured to perform certain functions; the disclosure contemplates that other devices or systems, such as transaction portal 117, buyer computing device 114, POS terminal 118, and cardholder computing device 121, may perform some or all of the functions ascribed to host computing device 112.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

This written description uses examples to disclose the embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for enabling communications through the Internet between a plurality of cardholders and a separate buyer for a purchase of an item by one of the plurality of cardholders on behalf of the buyer, the method implemented by a host computing device coupled to a memory, said method comprising:

hosting, by the host computing device, a transaction portal communicatively coupled, via the Internet, to a plurality of cardholder computing devices and a buyer computing device, wherein each of the plurality of cardholder computing devices is associated with a respective cardholder of the plurality of cardholders, wherein each of the plurality of cardholders is associated with a respective cardholder account, and wherein the buyer computing device is associated with the buyer;

receiving, by the host computing device via the transaction portal, cardholder data associated with each respective cardholder account, the cardholder data including at least one merchant association representing a merchant payment card issued to the respective cardholder;

receiving, by the host computing device via the transaction portal, proposal data from the buyer computing device, wherein the proposal data identifies the item proposed for purchase, a particular merchant associated with a particular merchant payment card, and a merchant purchase price;

filtering, by the host computing device using the proposal data and the cardholder data, a subset of relevant cardholders from the plurality of cardholders, wherein each cardholder of the subset of relevant cardholders includes the particular merchant payment card associated with the particular merchant identified in the proposal data;

causing, by the host computing device via the transaction portal, a list of the subset of relevant cardholders to be displayed on a user interface of the buyer computing device;

receiving, by the host computing device via the transaction portal, a selection message from the buyer computing device, wherein the selection message indicates a selected cardholder of the subset of relevant cardholders chosen to purchase the item on behalf of the buyer using the particular merchant payment card associated with the particular merchant;

reserving, by the host computing device, at least the merchant purchase price and a cardholder processing fee within a buyer account associated with the buyer; and transferring, by the host computing device, funds from the buyer account to a selected cardholder account associated with the selected cardholder, the funds determined at least in part by the merchant purchase price and the cardholder processing fee.

2. The method of claim 1, wherein the method further comprises providing relevant cardholder data to the buyer computing device, wherein the relevant cardholder data includes a list of cardholders associated with at least one merchant payment card that is associated with the particular merchant.

3. The method of claim 1, wherein the cardholder processing fee indicates a fee charged to the buyer for the purchase of the item by the selected cardholder, and includes at least one of a flat transaction amount, a percentage of the merchant purchase price, and an amount of rewards points.

4. The method of claim 1, wherein the method further comprises generating a transaction e-mail address and providing the transaction e-mail address to the selected cardholder.

5. The method of claim 4, wherein the method further comprises receiving purchase data indicating that the selected cardholder has purchased the item at the transaction e-mail address.

6. The method of claim 1, wherein the method further comprising assigning at least one of a cardholder rating to the selected cardholder and a buyer rating to the buyer.

7. The method of claim 1, wherein the method further comprising, associating at least one of a buyer pre-paid card with the buyer account and a selected cardholder pre-paid card with the selected cardholder account.

8. The method of claim 7, wherein reserving the merchant purchase price and the cardholder processing fee within the buyer account includes reserving the merchant purchase price and the cardholder processing fee on the buyer pre-paid card, and transferring funds from the buyer account to the selected cardholder account includes transferring funds from the buyer pre-paid card to the selected cardholder pre-paid card.

9. The method of claim 1, wherein the method further comprises receiving one of a cardholder confirmation message indicating the selected cardholder agrees to purchase the item on behalf of the buyer and a cardholder declination message indicating the selected cardholder does not agree to purchase the item on behalf of the buyer.

10. The method of claim 9, wherein the method further comprises receiving a second cardholder selection message from the buyer computing device indicating a second selected cardholder chosen to purchase the item on behalf of the buyer in response to receiving the cardholder declination message.

11. A computer-based system for enabling communications through the Internet between a plurality of cardholders and a separate buyer for a purchase of an item by one of the plurality of cardholders on behalf of the buyer, the system comprising:
   a host computing device coupled to a memory, the host computing device configured to:
      host a transaction portal communicatively coupled, via the Internet, to a plurality of cardholder computing devices and a buyer computing device, wherein each of the plurality of cardholder computing devices is associated with a respective cardholder of the plurality of cardholders, wherein each of the plurality of cardholders is associated with a respective cardholder account, and wherein the buyer computing device is associated with the buyer;
      receive, via the transaction portal, cardholder data associated with each respective cardholder account, the cardholder data including at least one merchant association representing a merchant payment card issued to the respective cardholder;
      receive, via the transaction portal, proposal data from the buyer computing device, wherein the proposal data identifies the item proposed for purchase, a particular merchant associated with a particular merchant payment card, and a merchant purchase price;
      filter, using the proposal data and the cardholder data, a subset of relevant cardholders from the plurality of cardholders, wherein each cardholder of the subset of relevant cardholders includes the particular merchant payment card associated with the particular merchant identified in the proposal data;
      cause, via the transaction portal, a list of the subset of relevant cardholders to be displayed on a user interface of the buyer computing device;
      receive, via the transaction portal, a selection message from the buyer computing device, wherein the selection message indicates a selected cardholder of the subset of relevant cardholders chosen to purchase the item on behalf of the buyer with the particular merchant payment card associated with the particular merchant;
      reserve at least the merchant purchase price and a cardholder processing fee within a buyer account associated with the buyer; and
      transfer funds from the buyer account to a selected cardholder account associated with the selected cardholder, the funds determined at least in part by the merchant purchase price and the cardholder processing fee.

12. The system of claim 11, wherein the host computing device is further configured to provide relevant cardholder data to the buyer computing device, wherein the relevant cardholder data includes a list of cardholders associated with at least one merchant payment card that is associated with the particular merchant.

13. The system of claim 11, wherein the cardholder processing fee indicates a fee charged to the buyer for the purchase of the item by the selected cardholder, and includes at least one of a flat transaction amount, a percentage of the purchase, and an amount of rewards points.

14. The system of claim 11, wherein the host computing device is further configured to generate a transaction e-mail address and provide the transaction e-mail address to the selected cardholder.

15. The system of claim 14, wherein the host computing device is further configured to receive purchase data indicating that the selected cardholder has purchased the item at the transaction e-mail address.

16. The system of claim 11, wherein the host computing device is further configured to assign at least one of a cardholder rating to the selected cardholder and a buyer rating to the buyer.

17. The system of claim 11, wherein the host computing device is further configured to associate at least one of a buyer pre-paid card with the buyer account and a selected cardholder pre-paid card with the selected cardholder account.

18. The system of claim 17, wherein the host computing device is further configured to reserve the merchant purchase price and the cardholder processing fee on the buyer pre-paid card, and transfer funds from the buyer pre-paid card to the selected cardholder pre-paid card.

19. The system of claim 11, wherein the host computing device is further configured to receive one of a cardholder confirmation message indicating the selected cardholder agrees to purchase the item on behalf of the buyer and a cardholder declination message indicating the selected cardholder does not agree to purchase the item on behalf of the buyer.

20. The system of claim 19, wherein the host computing device is further configured to receive a second cardholder selection message from the buyer computing device indicating a second selected cardholder chosen to purchase the item on behalf of the buyer in response to the cardholder declination message.

21. A non-transitory computer-readable storage media having computer-executable instructions embodied thereon for enabling communications through the Internet between a plurality of cardholders and a separate buyer for a purchase of an item by one of the plurality of cardholders on behalf of the buyer, wherein when executed by at least one processor associated with a host computing device and a memory, the computer-executable instructions cause the at least one processor to:
- host a transaction portal communicatively coupled, via the Internet, to a plurality of cardholder computing devices and a buyer computing device, wherein each of the plurality of cardholder computing devices is associated with a respective cardholder of the plurality of cardholders, wherein each of the plurality of cardholders is associated with a respective cardholder account, and wherein the buyer computing device is associated with the buyer;
- receive, via the transaction portal, cardholder data associated with each respective cardholder account, the cardholder data including at least one merchant association representing a merchant payment card issued to the respective cardholder;
- receive, via the transaction portal, proposal data from the buyer computing device, proposal data identifying the item proposed for purchase, a particular merchant associated with a particular merchant payment card, and a merchant purchase price;
- filter, using the proposal data and the cardholder data, a subset of relevant cardholders from the plurality of cardholders, wherein each cardholder of the subset of relevant cardholders includes the particular merchant payment card associated with the articular merchant identified in the proposal data;
- cause, via the transaction portal, a list of the subset of relevant cardholders to be displayed on a user interface of the buyer computing device;
- receive, via the transaction portal, a selection message, wherein the selection message indicates a selected cardholder of the subset of relevant cardholders chosen to purchase the item on behalf of the buyer with the particular merchant payment card associated with the particular merchant;
- reserve at least the merchant purchase price and a cardholder processing fee associated with the merchant payment card in a buyer account associated with the buyer; and
- transfer funds from the buyer account to a selected cardholder account associated with the selected cardholder, the funds determined at least in part by the merchant purchase price and the cardholder processing fee.

22. The non-transitory computer-readable storage media of claim 21, wherein the computer-executable instructions also cause the processor to provide relevant cardholder data to the buyer computing device, wherein the relevant cardholder data includes a list of cardholders associated with at least one merchant payment card that is associated with the particular merchant.

23. The non-transitory computer-readable storage media of claim 21, wherein the cardholder processing fee indicates a fee charged to the buyer for the purchase of the item by the selected cardholder, and includes at least one of a flat transaction amount, a percentage of the purchase, and an amount of rewards points.

24. The non-transitory computer-readable storage media of claim 21, wherein the computer-executable instructions also cause the processor to associate at least one of a buyer pre-paid card with the buyer account and a selected cardholder pre-paid card with the selected cardholder account.

25. The non-transitory computer-readable storage media of claim 24, wherein the computer-executable instructions also cause the processor to reserve the merchant purchase price and the cardholder processing fee on the buyer pre-paid card, and transfer funds from the buyer pre-paid card to the selected cardholder pre-paid card.

* * * * *

UNITED STATES PATENT AND TRADEMARK OFFICE
CERTIFICATE OF CORRECTION

| | |
|---|---|
| PATENT NO. | : 10,970,702 B2 |
| APPLICATION NO. | : 16/267173 |
| DATED | : April 6, 2021 |
| INVENTOR(S) | : Sharma et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 58 days.

Signed and Sealed this
Thirty-first Day of January, 2023

*Katherine Kelly Vidal*

Katherine Kelly Vidal
*Director of the United States Patent and Trademark Office*